United States Patent
Diaz et al.

(10) Patent No.: US 8,260,995 B2
(45) Date of Patent: *Sep. 4, 2012

(54) PROCESSOR INTERRUPT COMMAND RESPONSE SYSTEM

(75) Inventors: Juan Francisco Diaz, Round Rock, TX (US); Dirie N. Herzi, Round Rock, TX (US); Robert Volentine, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,050

(22) Filed: Jul. 7, 2011

(65) Prior Publication Data

US 2011/0264837 A1 Oct. 27, 2011

Related U.S. Application Data

(63) Continuation of application No. 12/145,570, filed on Jun. 25, 2008, now Pat. No. 7,991,933.

(51) Int. Cl.
*G06F 13/24* (2006.01)
*G06F 1/12* (2006.01)
(52) U.S. Cl. .............. 710/261; 710/267; 713/375
(58) Field of Classification Search .......... 710/261
See application file for complete search history.

(56) References Cited

U.S. PATENT DOCUMENTS

| | | | |
|---|---|---|---|
| 6,480,966 B1 * | 11/2002 | Rawson, III | 713/400 |
| 7,222,200 B2 | 5/2007 | Gupta et al. | |
| 7,363,411 B2 | 4/2008 | Kobayashi et al. | |
| 7,464,211 B2 | 12/2008 | Shah | |
| 2005/0086405 A1 | 4/2005 | Kobayashi et al. | |
| 2005/0114578 A1 | 5/2005 | Lewis | |
| 2005/0246587 A1 * | 11/2005 | Bernick et al. | 714/38 |
| 2006/0047876 A1 | 3/2006 | Stultz | |
| 2006/0168434 A1 * | 7/2006 | Del Vigna et al. | 712/244 |
| 2006/0282589 A1 | 12/2006 | Ueltschey et al. | |
| 2007/0294576 A1 * | 12/2007 | Vigna et al. | 714/13 |
| 2008/0071957 A1 | 3/2008 | Shah | |
| 2008/0196037 A1 * | 8/2008 | Ple | 718/107 |
| 2009/0049323 A1 | 2/2009 | Imark et al. | |

FOREIGN PATENT DOCUMENTS

WO  WO 2005/036398  4/2005

* cited by examiner

*Primary Examiner* — Ryan Stiglic
(74) *Attorney, Agent, or Firm* — Haynes and Boone, LLP

(57) ABSTRACT

A system to synchronize processors includes one or more subsystems to receive an interrupt command, instruct a plurality of processors to enter an entry synchronization loop of an interrupt handler, determine by each of the plurality of processors whether all of the plurality of processors have entered their respective interrupt handler before exiting the entry synchronization loop, determine whether a timeout value has been reached, determine type of the interrupt command received and in response to the type of interrupt command received, determine whether to exit the entry synchronization loop after the timeout value has been reached.

20 Claims, 3 Drawing Sheets

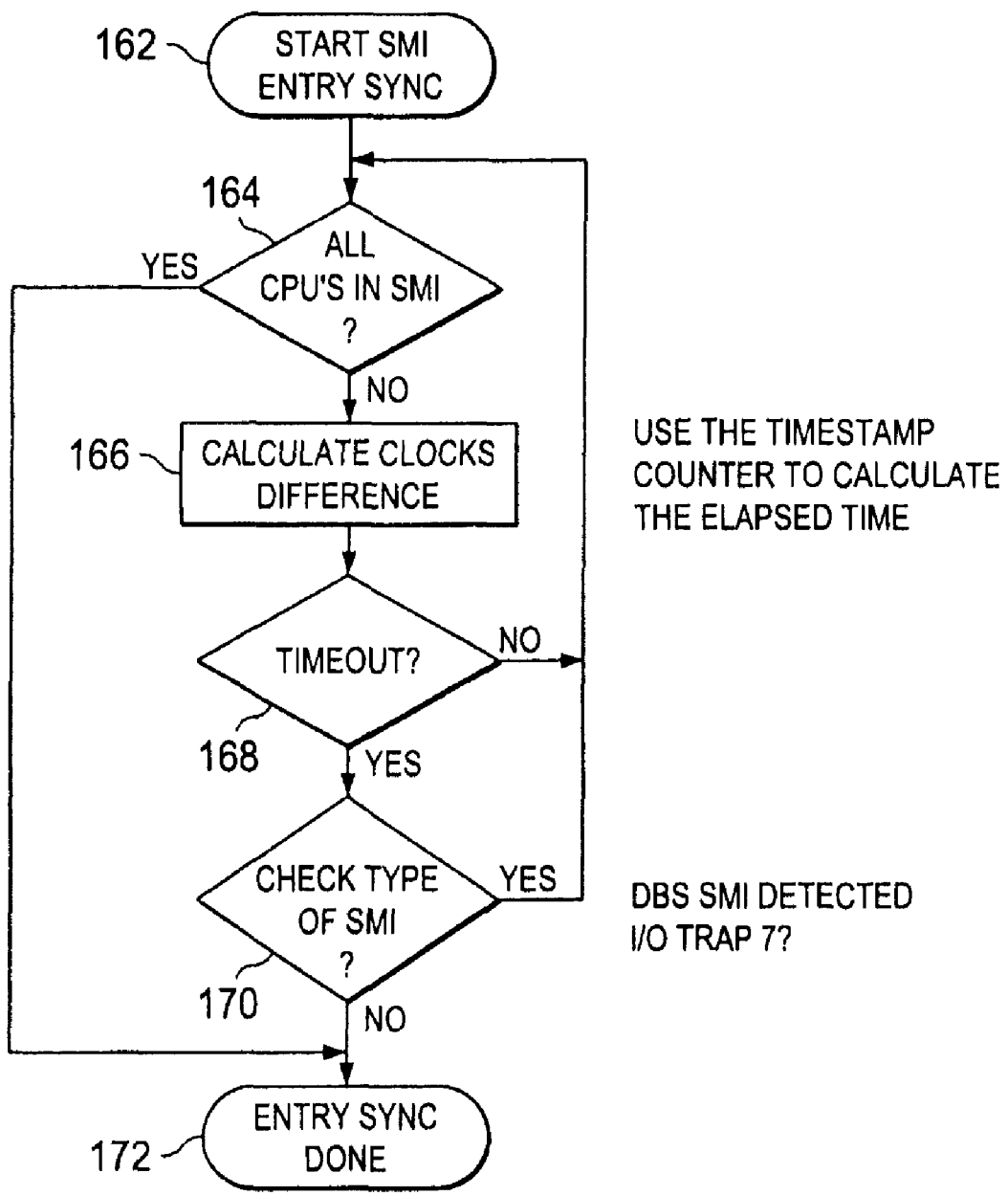

PROCESSOR INTERRUPT COMMAND RESPONSE SYSTEM

CROSS REFERENCE TO RELATED APPLICATIONS

The present application claims priority to and is a continuation of co-owned, co-pending U.S. patent application Ser. No. 12/145,570 filed Jun. 25, 2008, the disclosure of which is incorporated herein by reference.

BACKGROUND

The present disclosure relates generally to information handling systems, and more particularly to synchronizing processors when entering a system management mode.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Processors used in IHSs are generally provided having cache memory for storing information that is accessible by the processor. Using the cache memory is generally faster than an IHS's main memory. The cache memory is traditionally smaller and faster than the main memory and may be used to store the data that is most frequently used by the processor. Processors are being provided with larger and larger cache memory sizes. Some cache memories utilize multi-level caches (e.g., level 1 (L1), level 2 (L2), level 3 (L3) and the like). For example, some processors may have a 4 MB L2 cache or a 16 MB L3 cache. However, any number of levels and any size of cache memory may be used.

Processors may be provided to including multiple core processors in a single package. Some processor packages may operate more efficiently by operating as two "logical" processors to the host operating system, thereby allowing the operating system to schedule two threads or processes concurrently in a multi-processor system. In other words, in multiple core processors, one processor appears to the system to be multiple processors. This is generally known in the art as threading. In some processors, 4, 8, 16 and 32 processor threads may be enabled. However, in other processors, any number of processor threads may be enabled.

A problem arises when the multiple processors/threads are called to enter a system management mode (SMM) simultaneously as the result of a system management interrupt (SMI). An SMI is generally known in the art as a command to interrupt the processor or processors to perform an action. Some examples of triggers for an SMI are system temperature, memory errors, and input/output trap (e.g., writing to an I/O port), certain hardware/software events, universal serial bus (USB) events, and/or a variety of other events. As an example of an SMI, the system may need to handle an SMI for what is known in the art as demand based switching (DBS) or other similar systems for allowing the clock speed of the processor to be dynamically changed by software.

In DBS or other similar systems, all the processors (e.g., central processing units (CPUs), application processors (APs)) may be required to enter their SMI handler. A timeout value of 256 micro seconds in the processor entry synchronization timing loop of the SMI handler may prevent a processor from hanging when one or more processors cannot enter it's SMI handler. During processor initialization, for example, it is generally expected behavior that a processor times out waiting for all processors to enter their SMI handler. Also for runtime SMI operation, a timeout of 256 micro seconds is generally more than adequate for most SMI's. Certain types of processor instructions however can delay a CPU from entering it's SMI handler beyond this 256 micro second timeout. Processors with large cache sizes, as described above, can be delayed more than 400 micro seconds or longer depending upon cache size from entering SMI when executing certain instructions, such as, WBINVD instructions. WBINVD instructions are generally known in the art as instructions to write back and flush internal caches and/or instructions to initiate writing-back and flushing of external caches. For certain types of SMIs, such as a DBS SMI, where all processors must enter their SMI handler and check-in or sync with all processors in the system, a long delay for one or more processors entering SMI may result in a timeout in the SMI handlers of the other processors. These early processors may exit their SMI handler before other processors that are still executing WBINVD or similar types of instructions enter SMI. Because processors are generally required to be in SMI simultaneously, this may result in a system hang or other type of catastrophic failure.

Accordingly, it would be desirable to provide improved synchronization for processors when entering a system management mode, absent the disadvantages discussed above.

SUMMARY

According to one embodiment, a system to synchronize processors includes one or more subsystems to receive an interrupt command, instruct a plurality of processors to enter an entry synchronization loop of an interrupt handler, determine by each of the plurality of processors whether all of the plurality of processors have entered their respective interrupt handler before exiting the entry synchronization loop, determine whether a timeout value has been reached, determine type of the interrupt command received and in response to the type of interrupt command received, and determine whether to exit the entry synchronization loop after the timeout value has been reached.

BRIEF DESCRIPTION OF THE DRAWINGS

FIG. 3 illustrates a flow chart of an embodiment of a method to synchronize processors when entering a system management mode.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
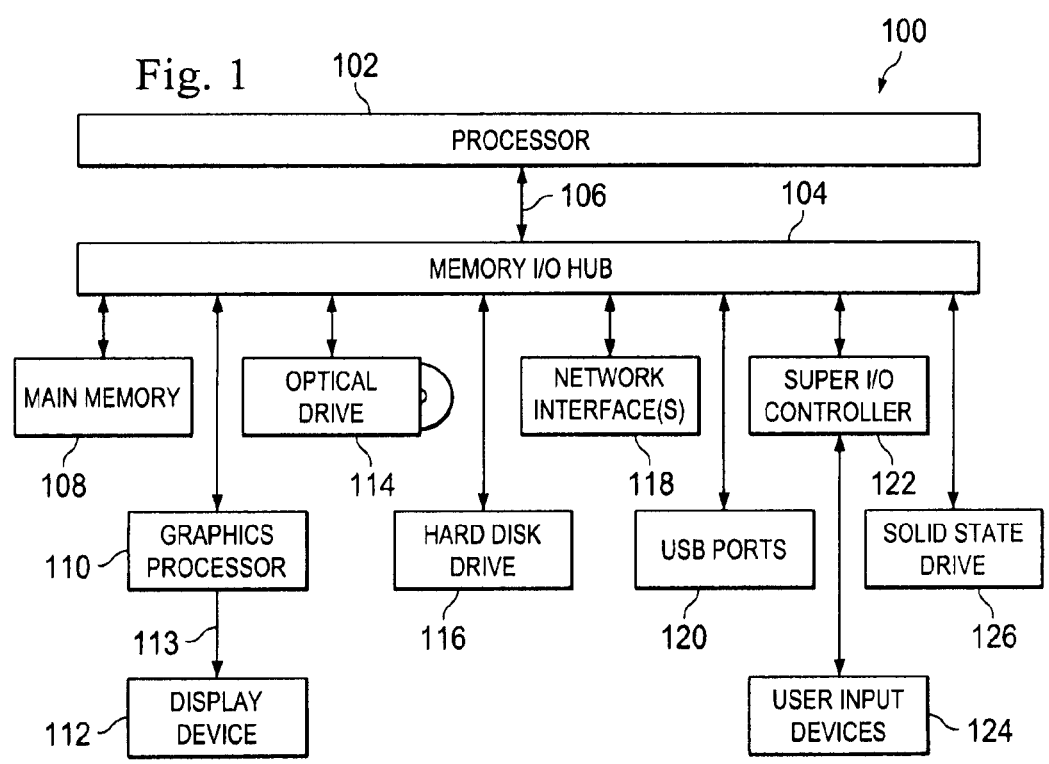
FIG. 1 illustrates an embodiment of an information handling system (IHS).

FIG. 1 is a block diagram of IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
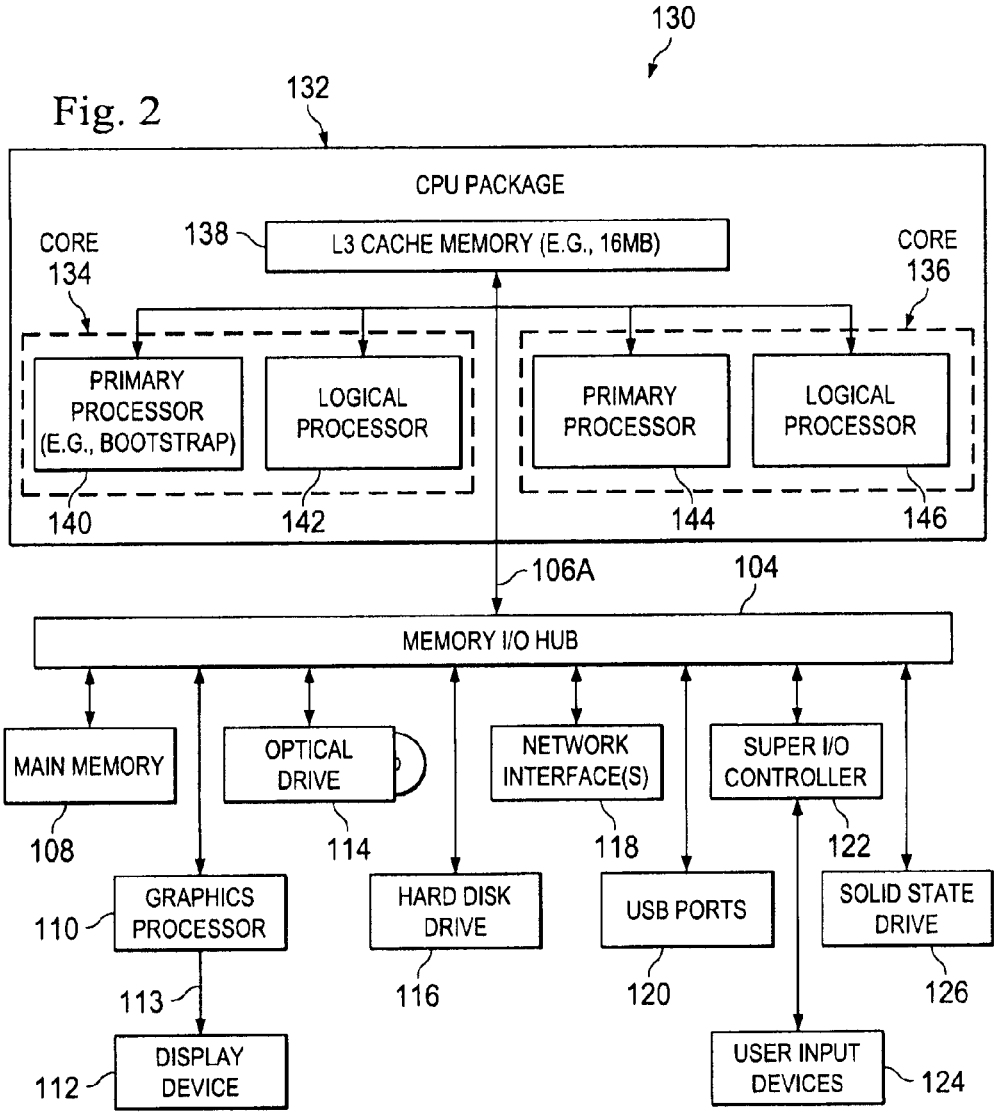
FIG. 2 illustrates an embodiment of an information handling system (IHS) having a multiple core processor.

FIG. 2 illustrates an embodiment of an information handling system (IHS) 130 having a multiple core processor package 132. The IHS 130 is similar to the IHS 100 and may perform similar operations and is coupled to the memory I/O hub 104 via a front side bus 106A. The IHS 130 may have multiple core processors (e.g., core 134 and core 136) that are included in a single package 132. In an embodiment, the processor package/the CPU package 132 includes the processor cores 134 and 136. Core 134 includes processors 140 and 142. Core 136 includes processors 144 and 146. As should be readily understood by a person having ordinary skill in the art, the processors 140 and 142 of core 134 and the processors 144 and 146 of core 136 may work independently or together to process information. The processors 140, 142, 144 and 146 are coupled with a cache memory 138. Any number of processors 140, 142, 144, and 146 and any number and any size of cache memory 138 may be used by the IHS 130. The processors 140, 142, 144, and 146 may be described to one having ordinary skill in the art as threads. In an embodiment, the core 134 has a primary thread processor 140 and a logical thread processor 142. Similarly, the core 136 has a primary thread processor 144 and a logical thread processor 146. This is generally known in the art as threading. These processors may operate as multiple processors to the IHS's 130's host operating system. This, in turn, allows the operating system to schedule multiple threads or processes concurrently in the multi-processor system. An IHS 130 may have any number of threads in a package 132 and may have any number of processor packages 132 in the IHS 130. For example, an IHS may have four threads in a processor package and may have four processor packages, thereby totaling sixteen threads in the IHS. In an embodiment, the processor 140 may be configured as a bootstrap processor (e.g., the "lead" processor) for the processor package 132. Any of the processors 140, 142, 144, or 146 may be the bootstrap processor. The bootstrap processor 140 communicates with the other processors 142, 144, and/or 146 to instruct the other processors 142, 144, and/or 146 to initialize or follow the bootstrap processor's 140 lead. As such, the bootstrap processor may cause all of the processors 140, 142, 144, and/or 146 to perform an operation, such as, loading operation instructions, performing an interrupt, and a variety of other operations.

In operation, the IHS 130 may receive triggers from an operating system for a system management interrupt (SMI). An SMI is generally known in the art as an operation where the IHS suspends all normal operation and special operations are executed and then the IHS 130 returns to normal operation. There are many events that trigger an SMI and the IHS 130 may perform differently for the different SMI trigger events. If, for example, an SMI is triggered by an event such as a single bit memory error which is a memory error, but not a failure, the SMI logs the error and all of the processor threads 140, 142, 144 and 146 are not required to be synchronized or synced. In this situation, the IHS 130 waits for a log of the error to happen and the bootstrap processor thread 140 logs the error in a board management controller (BMC). Thus the IHS 130 only needs the bootstrap processor thread 140 because the bootstrap processor thread 140 logs the error and tells the other processor threads 142, 144 and 146 that no action is needed by them at that time. The bootstrap processor thread 140 then orders the other processor threads 142, 144 and 146 (e.g., application processors (APs)) to exit the SMI.

However, in operation the IHS 130 may receive an SMI trigger for an event such as demand based switching (DBS). DBS changes performance states (p-states) of the processor 102 and/or the processors 140, 142, 144 and 146 under the control of the operating system. In this type of SMI, all of the processors 140, 142, 144 and 146 need to be synchronized so that each processor thread may change p-state under the operating system's control.

Under certain operating conditions, processor 140, 142, 144, 146 synchronization when entering an SMI can be problematic, as was described in the above background section of this application. FIG. 3 illustrates a flow chart of an embodiment of a method 160 to synchronize the processors (e.g., processors 140, 142, 144, and/or 146) when entering a system management mode. This method solves the synchronization problems described above, while minimizing the risk to system operation and SMI servicing under normal operating conditions. The method 160 starts at 162 where the IHS 130 has received an SMI instruction and all of the system processors 140, 142, 144 and 146 will enter an entry synchronization loop of their respective SMI handlers. The entry synchronization loop is the looping process of method 160 throughout the method steps as described below. An SMI handler is a code or set of instructions that control the SMI process. The method 160 then proceeds to decision block 164 where each of the system processors 140, 142, 144 and 146 check to determine whether all of the system processors 140, 142, 144 and 146 have entered their SMI handlers before exiting the entry synchronization loop of their own SMI handler. If the answer in decision block 164 is yes, all of the system processors 140, 142, 144 and 146 have entered their SMI handlers before exiting the entry synchronization loop of their own SMI handler. The method 160 ends at block 172 where the execution of the SMI Entry Synchronization loop is completed and the processors 140, 142, 144 and 146 continue executing that processor's SMI handler code. If the answer in decision block 164 is no, all of the system processors 140, 142, 144 and 146 have not entered their SMI handlers before exiting the entry synchronization loop of their own SMI handler. The method 160 proceeds to block 166 where each processor 140, 142, 144 and 146 calculate a total elapsed time since entering the entry synchronization loop. In an embodiment, the method 160 may use a timestamp counter to calculate the elapsed time. However, other methods of calculation may be used for the method 160. Next, the method 160 proceeds to decision block 168 where each of the processors 140, 142, 144 and 146 check to determine whether the timeout value has been reached. If the answer in decision block 168 is no, the timeout value has not been reached, the method 160 loops or returns to decision block 164. If the answer in decision block 168 is yes, the timeout value has been reached. The method 160 proceeds to decision block 170 where each processor 140, 142, 144 and 146 determines the type of SMI that has caused the processor to enter its SMI handler. If the answer in decision block 170 is yes, the SMI is a predetermined specific type of SMI (e.g., the SMI trigger is a DBS SMI), the processor will not exit the entry synchronization loop even though the timeout value has been exceeded in decision block 168 and the method 160 returns to decision block 164 to repeat the sequence. On the other hand, if the answer in decision block 170 is no, the SMI type is not the predetermined specific type of SMI (e.g., the SMI trigger is a single bit memory error), the method 160 ends at block 172 where the execution of the SMI Entry Synchronization loop is completed and the processors 140, 142, 144 and 146 continue executing that processor's SMI handler code.

For simplicity, in the described implementation of this disclosure, the specific type of predetermined SMI is a DBS SMI. However, it should be readily understood by those having ordinary skill in the art that the predetermined specific type of SMI could be any type of SMI or multiple types of SMIs. This step in the entry synchronization loop sequence may override or prevent a processor 140, 142, 144 and/or 146 from exiting the entry synchronization loop even though the timeout value has been reached. That is, each processor 140, 142, 144 and/or 146 may wait any period of time for all processors 140, 142, 144 and/or 146 in the IHS 130 to enter their respective SMI handler.

In an embodiment, instead of forcing a processor 140, 142, 144 and/or 146 to wait indefinitely in the entry synchronization loop for all processors 140, 142, 144 and/or 146 to enter the SMI, one could simply increase the total timeout value for the entry synchronization loop. The timeout value may be increased for selected SMI types only without impacting the servicing and timeouts for all SMIs.

Method 160 allows for the isolation and enumeration of specific SMI types. This, in turn, reduces operation risk of the IHS 130 by not changing the way SMI synchronization is handled for most other types of SMI's. The method 160 also provides flexibility within the SMI entry sync loop by allowing a processor 140, 142, 144 and/or 146 to wait any period of time for all processors 140, 142, 144 and/or 146 to enter SMI or by increasing or decreasing the standard delay to any desired value. In an embodiment, the method 160 may be implemented in IHS servers to solve synchronization problems requiring modifications to the processor entry synchronization algorithm when WBINVD instructions are executed on some processors 140, 142, 144 and/or 146 during demand based switching (DBS) SMIs. In an embodiment, the present disclosure may detect an SMI type as part of a sync loop, and if matching a particular SMI type, vary the timeout to any value in the range of zero to infinite time.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processor interrupt command response system, comprising:
    a plurality of processors, wherein in response to receiving an interrupt command, each of the plurality of processors is operable to:
        enter a processor syncing process;
        determine that at least one of the plurality of processors has not entered the processor syncing process;
        determine that a predetermined time has passed since entering the processor syncing process;
        remain in the processor syncing process in response to the interrupt command being a first type of interrupt command; and
        exit the processor syncing process in response to the interrupt command being a second type of interrupt command.

2. The system of claim 1, wherein each of the plurality of processors is further operable to:
    execute interrupt instructions in response to exiting the processor syncing process.

3. The system of claim 1, wherein the plurality of processors include at least one logical processor.

4. The system of claim 1, wherein the predetermined time is a timeout value for exiting the processor syncing process, and wherein in response to the interrupt command being the first type of interrupt command, the exiting the processor syncing process is overridden.

5. The system of claim 1, wherein the first type of interrupt command is an interrupt command associated with a change in processor performance state.

6. The system of claim 1, wherein the second type of interrupt command is an interrupt command associated with a memory error.

7. The system of claim 1, wherein in response to the interrupt command being the first type of interrupt command, the processor remains in the processor syncing process and is further operable to:
    determine that all of the plurality of processors have entered the processor syncing process subsequent to determining that at least one of the plurality of processors had not entered the processor syncing process.

8. The system of claim 1, wherein the predetermined time includes a first predetermined time, and wherein in response to the interrupt command being the first type of interrupt command, the processor remains in the processor syncing process and is further operable to:
- determine that a second predetermined time has passed since determining the first predetermined time had passed and, in response, exit the processor syncing process.

9. An information handling system (IHS), comprising:
a multi-core processor including a plurality of processor threads, wherein in response to receiving an interrupt command, each of the plurality of processor threads is operable to:
- enter a syncing process;
- determine that at least one of the plurality of processor threads has not entered the syncing process;
- determine that a predetermined time has passed since entering the syncing process;
- remain in the syncing process in response to the interrupt command being a first type of interrupt command; and
- exit the syncing process in response to the interrupt command being a second type of interrupt command.

10. The IHS of claim 9, wherein each of the plurality of processor threads is further operable to:
- execute interrupt instructions in response to exiting the syncing process.

11. The IHS of claim 9, wherein the predetermined time is a timeout value for exiting the syncing process, and wherein in response to the interrupt command being the first type of interrupt command, the exiting the syncing process is overridden.

12. The IHS of claim 9, wherein the first type of interrupt command is an interrupt command associated with a change in processor performance state.

13. The IHS of claim 9, wherein the second type of interrupt command is an interrupt command associated with a memory error.

14. The IHS of claim 9, wherein in response to the interrupt command being the first type of interrupt command, the processor thread remains in the syncing process and is further operable to:
- determine that all of the plurality of processor threads have entered the syncing process subsequent to determining that at least one of the plurality of processor threads had not entered the syncing process.

15. The IHS of claim 9, wherein the predetermined time includes a first predetermined time, and wherein in response to the interrupt command being the first type of interrupt command, the processor thread remains in the syncing process and is further operable to:
- determine that a second predetermined time has passed since determining the first predetermined time had passed and, in response, exit the syncing process.

16. A method for responding to interrupt commands, comprising:
- entering a processor syncing process in response to receiving an interrupt command;
- determining that at least one of a plurality of processors has not entered the processor syncing process;
- determining that a predetermined time has passed since entering the processor syncing process;
- remaining in the processor syncing process in response to the interrupt command being a first type of interrupt command; and
- exiting the processor syncing process in response to the interrupt command being a second type of interrupt command.

17. The method of claim 16, wherein the first type of interrupt command is an interrupt command associated with a change in processor performance state.

18. The method of claim 16, wherein the second type of interrupt command is an interrupt command associated with a memory error.

19. The method of claim 16, further comprising:
- in response to remaining in the processor syncing process, determining that all of the plurality of processors have entered the processor syncing process subsequent to determining that at least one of the plurality of processors had not entered the processor syncing process.

20. The method of claim 16, wherein the predetermined time includes a first predetermined time, and the method further comprises:
- in response to remaining in the processor syncing process, determining that a second predetermined time has passed since determining the first predetermined time had passed and, in response, exiting the processor syncing process.

* * * * *